Oct. 2, 1923.
W. H. FLINT
CAULKING MACHINE FOR PIPE JOINTS
Filed March 18, 1919
1,469,297
2 Sheets-Sheet 1
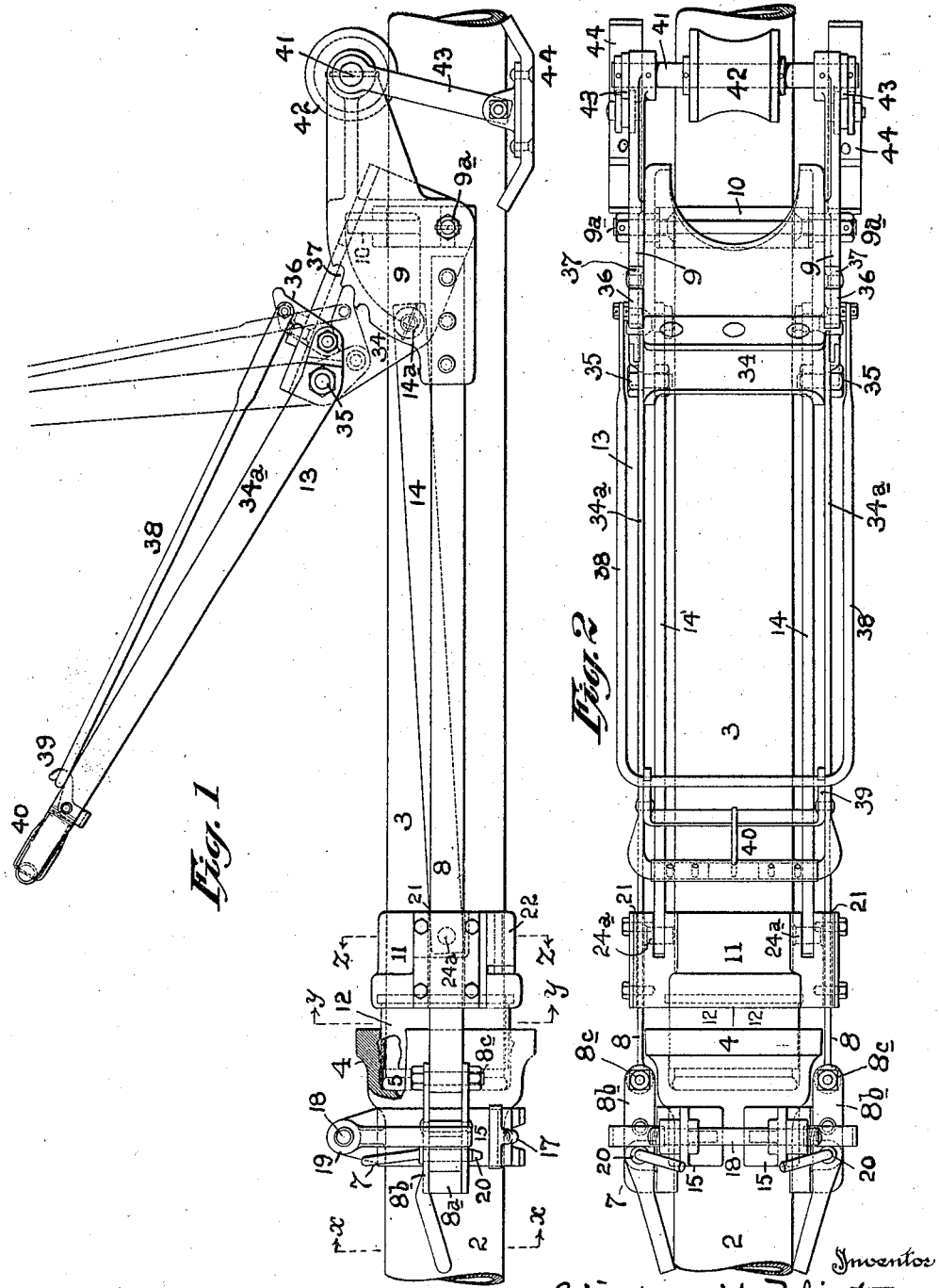

Oct. 2, 1923.
W. H. FLINT
CAULKING MACHINE FOR PIPE JOINTS
Filed March 18, 1919   2 Sheets-Sheet 2
1,469,297
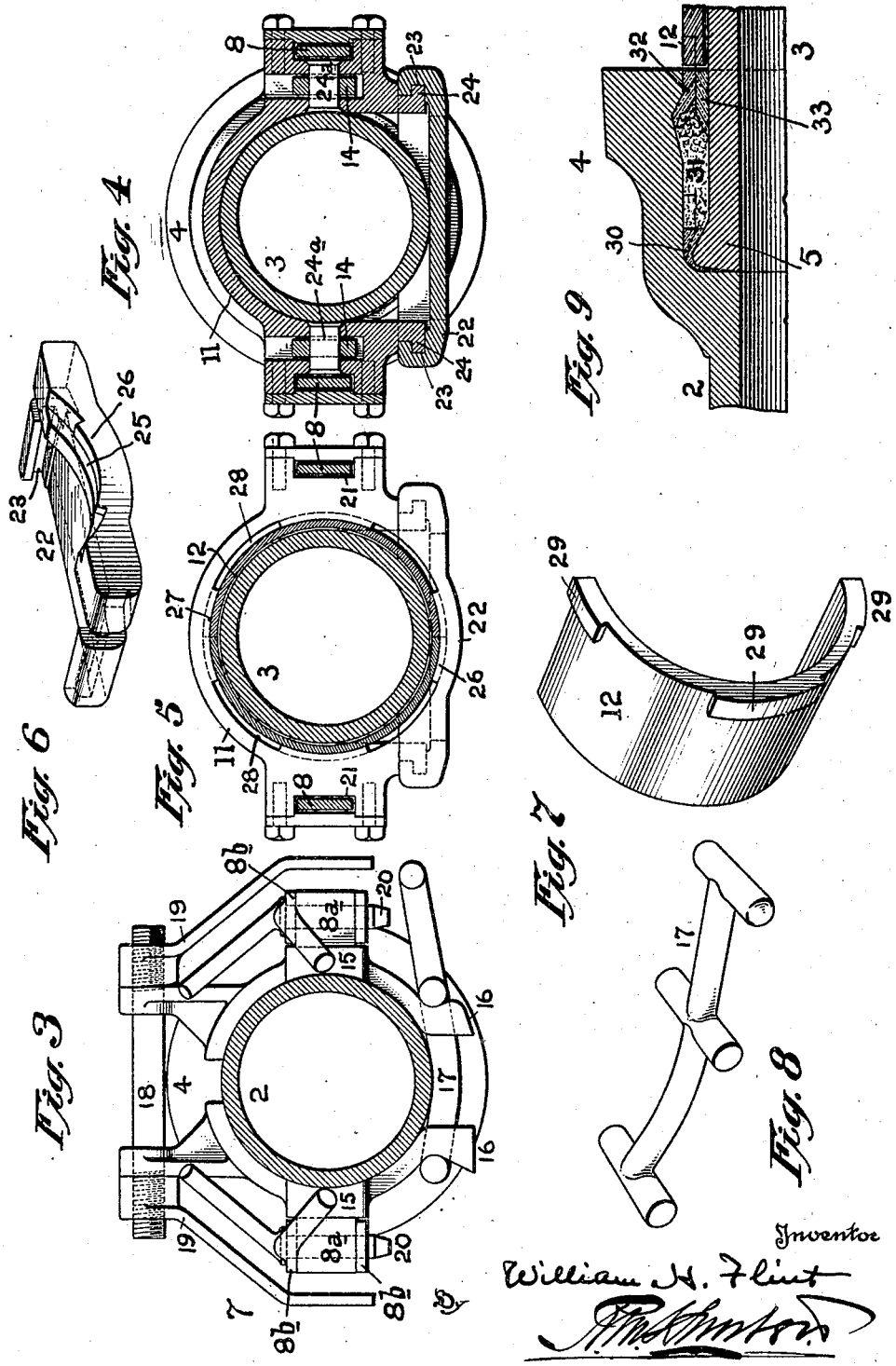

Patented Oct. 2, 1923.

1,469,297

UNITED STATES PATENT OFFICE.

WILLIAM H. FLINT, OF BIRMINGHAM, ALABAMA.

CALKING MACHINE FOR PIPE JOINTS.

Application filed March 13, 1919. Serial No. 283,379.

*To all whom it may concern:*

Be it known that I, WILLIAM H. FLINT, citizen of the United States, and resident of Birmingham, county of Jefferson, and State of Alabama, have invented an Improvement in Calking Machines for Pipe Joints, of which the following is a specification.

The object of my invention is to provide a portable calking machine for pipe joints of the bell and spigot pattern or type, in which the bell is packed with yarn and metal.

More particularly, my invention has for its object the provision of portable calking means which are especially adapted to a joint of the character set out in my application, Serial Number 249,993, filed August 15, 1918, and which is referred to hereinafter.

In laying cast iron pipe of the bell and spigot pattern, the packing of the joints has been relatively slow and more or less unsatisfactory, and it is the purpose of my invention set out in my former application referred to, to provide a packing joint which shall be especially tight and effective, and to also provide in the present application suitable portable means which may be operated to properly and successfully calk a joint of the character above referred to as well as being suitable for calking the joints as heretofore commonly made.

The essential characteristic features of my invention reside in providing a detachable head adapted to engage one section of the pipe back of the bell portion thereof, in further providing a detachable sliding element adapted to the spigot end of the next adjacent section provided with calking means adapted to enter the space between the spigot and bell ends of the engaging pipe sections, and said head and calking element associated and combined with power devices suitably connected with the head and adapted to forcibly move the calking element toward and from the bell for the purpose of forcing in the calking substances, whether they be metal or textile material, or both, the said apparatus being detachable so as to be successively used at each joint along the line of piping.

My invention also consists of improvements hereinafter described whereby the above objects and results are attained, said improvements comprising certain organization and combination of parts which are fully described hereinafter and more particularly defined in the claims.

For the purpose of illustrating the general nature of my invention, I have shown in the accompanying drawing, a suitable embodiment thereof which is in form to give satisfactory and reliable results, but it is to be understood that the details embodied in the said illustration and constituting the several instrumentalities of which the invention consists, are given by way of example only to arrive at a clear and definite understanding of the essential features entering into the invention.

Referring to the drawings, Fig. 1 is a side elevation of two pipe sections with my improved calking machine applied thereto; Fig. 2 is a plan view of the same; Fig. 3 is a rear elevation of the clamping head and with the pipe sectioned on line $x$—$x$ of Fig. 1; Fig. 4 is a cross section taken on line $z$—$z$ of Fig. 1; Fig. 5 is a cross section taken on line $y$—$y$ of Fig. 1; Fig. 6 is a perspective view of the locking section of the calking head; Fig. 7 is a perspective view of one section of the calking tool; Fig. 8 is a perspective view of the locking member of the clamping head shown in Fig. 3; Fig. 9 is a longitudinal section of my improved bell and spigot joint in its finished calked condition.

2 is one section of pipe, and 3 is the next section, section 2 having the bell or socket 4, and section 3 having the spigot end 5 which fits into the bell, and which is to be calked in the manner indicated in Fig. 9, for example. Broadly considered, my machine is adapted to calk the packing of the pipe joint, irrespective of the particular kind of packing employed, but the machine is especially useful in packing the particular character of joint which is illustrated in Fig. 9 of the drawings, and set out in my application herein before referred to. Briefly stated, my improved pipe joint comprises a tapered lead packing 30 which is arranged annularly about the spigot end 5 and in the seat of the bell socket and which when driven in from the dotted position into the curved section line position provides a tight metallic calking. Back of this metallic calking 30 is the textile packing 31 which may be of ordinary plumbers tarred yarn run through a shredder and twisted into a rope form. The packing is further completed by driving into the space between the bell 4 and the spigot end of the pipe section 3 two annularly superimposed lead packing strips, 32 and 33, whose inner edges are beveled, and which when pressed upon the textile packing spread as indicated and lock the packing firmly in position. In the use of my improved machine, the calking tool 12 is employed to force the lead strip 30 into calking position; this tool is next employed to compress the textile packing 31; and finally the said calking tool or a shorter one is employed to force into position the outer lead strips 32 and 33 so that the completed packing is as indicated in Fig. 9.

7 indicates a detachable head which may be clamped to the pipe 2 adjacent to the bell 4 thereof, and upon which the pull or strain in the act of calking may come. This head and its connection with the bell provides the basic resistance which permits the proper action of the calking tool 12 to take place, said action being insured by the following instrumentalities. From the head 7 there extends on each side of the bell 4 and pipe 3 horizontal bars 8 whose ends are secured to transverse castings 9 which are provided with a transverse arch 10, bridging over the body of the pipe 3, and resting thereon so as to support the said castings 9, the bars 8 and the power devices 13 which are hinged to the castings 9 by the transverse bolts 9$^a$.

The calking tool 12 is of cylindrical shape so as to surround the pipe 3, and is sufficiently thin radially considered to be able to freely pass into the annular space between the bell 4 and the spigot end of the pipe 3, as is indicated in Fig. 1. This calking tool 12 is carried by a head 11, which is removably positioned about the pipe 3 and is guided upon the said bars 8 above described. In this manner the calking head 11 with its calking tool 12 may be reciprocated longitudinally of the pipe 3 while having its weight supported upon the side bars 8. The calking head 11 is moved by the links 14 which are hinged to the calking head at 24$^a$, and hinged at their other ends to the swinging frame 34 of the power devices 13. It will be manifest that when the frame 34 is moved about its fulcrum or axis 9$^a$, the links 14 will impart motion to the calking head 11, and thereby bring the calking tool 12 into thrusting relation with the packing within the bell. It will also be evident that when the thrust comes upon the calking tool, the frame 9 must be held against movement away from the bell 4, and this is accomplished by means of the two side bars 8 and the head 7 which is held against longitudinal movement by the bell of the pipe 2.

Having, in a general way, shown the relation of the various parts, I will now describe the various elements entering into the machine more in detail.

The head 7 is best shown in Figs. 1, 2 and 3 and comprises two portions 15 which are made substantially semi-circular and fit about the pipe 2. The lower portions of these parts 15 are provided with slotted hook shape parts 16, which are linked together by the connecting bar 17, best shown in Figs. 3 and 8. The upper part of the semi-circular portions 15 are connected by a transverse rod 18, screw threaded on its ends and provided with nuts 19 by which tension may be put upon the rod 18, and in that manner clamp the semi-circular parts 13 tightly in position. This head 7, comprising the parts described, has a less diameter of opening than the greatest diameter of the bell portion 4 of the pipe, so that it cannot be pulled over the bell; hence said bell acts as an abutment against which the head 7 is received and held against longitudinal movement upon the pipe section 2.

I do not restrict myself in any manner to the construction of this head, as any suitable construction may be employed which will fit to the bell end of the pipe section 2 whereby it cannot be pulled over the bell and whereby it acts as a support for the side bars 8 upon which the pull is exerted when the calking operation is taking place. I have shown, however, a convenient frame by way of example, which will accomplish the results required. 8$^a$ indicate lateral lugs from the sides of the semi-circular parts 15 adapted to receive the link portions 8$^b$ which fit above and below them and which are detachably connected with said lugs by vertically removable pins 20. To the other ends of the link portions 8$^b$ there are vertical bolts 8$^c$ for securing the said links to the ends of the side bars 8. In this manner, the pull upon the side bars 8 is exerted through the link portions 8$^b$ upon the pins 20 and thence through the lugs 8$^a$, upon the head 7.

The calking head 11 is shown as made in inverted U form and is best shown in Figs. 4, 5 and 6. This head may be put into place upon the pipe 3 by straddling the said pipe and then locked thereto by means of the locking bar 22, extending across the bottom portions from side to side. As will be seen from Fig. 4, the lower side edges of the head 11 are provided with longitudinal flanges 24 which are received in longitudinal side grooves 23 in the locking bar 22. In this manner, the locking bar may be slid longitudinally into the locking position. Furthermore, the end of the locking bar next adjacent to the bell is constructed as shown in Figs. 5 and 6, having the groove 25 and the flange 26, which parts are in circumferential alinement with the corresponding grooves and flanges 27 on the head 11, said grooves and flanges receiving the flange portions 29 of the calking tool 12.

By this construction the calking tool sections 12 are attached to the calking head 11 by a bayonet joint and hence are easily detachable when required. As the locking section or bar 22 fits upon the guide flanges 24 of the head 11 and comes into fixed position with its grooves 25 and flange 26 in transverse alinement with the corresponding parts of the head, it will readily be understood that so far as receiving and supporting the calking tool 12, it is as if it were integral with the head 11. When it is desired to detach the calking tool and head, for shifting to the next joint to be calked, it is only necessary to rotate the calking tool sections 12 and then pull them forward, next remove the locking section or bar 22 from the head 11 and lift the latter upward with the side frames 8 of the machine.

The connection of the calking head with the side frames or bars 8 is clearly shown in Fig. 5, from which it will be seen that the head has horizontal guide slots 21 through which the frames or bars 8 extend and upon which the head and its calking tool is supported and guided. The connection of the calking head with the links or thrust bars 14, leading from the power devices, is shown in Fig. 4, wherein the bars 14 fit into slotted portions or sockets and are hinged upon transverse pins 24$^a$.

Referring now to the power devices, the frame 34, which is hinged at 9$^a$ to the frame 9 on the ends of the side frames or bars 8 and also hinged at 14$^a$ to the links 14 for operating the calking means, is free to oscillate or rock upon 9$^a$ as a fulcrum and hence acts as a lever. 34$^a$ is a hand lever which is hinged to the frame 34 at 35. To the lower end or heel of this hand lever is hinged a pawl 36, which is shaped to engage the ratchet teeth and sockets 37 on the frames 9. When the power device is in operation the pawl 36 engages the teeth 37, as indicated in dotted lines (Fig. 1); and by pulling upon the hand lever toward the calking tool, the frame 34 will be rocked downward and cause its pivot connection 35 with frame 9 but also move the latter downward, which will impart a longitudinal or calking motion to the rods 14, the head 11 and its tool 12. By adjusting the pawl into the sockets of the respective teeth 37, the position of the calking tool with respect to the bell 4 will be varied for the same initial position of lever 34$^a$, but in all such positions of adjustment the operation of the hand lever 34$^a$ will be the same in its effectiveness in applying power in the act of calking. It will be understood, however, that by the adjustment of pawl 36 into different sockets 37, the calking tool may be made to enter the bell to a greater or less distance in the calking operation with the same throw of the lever 34$^a$. In Fig. 1, the pawl 36 is shown as held out of action and this is done by having the rod 38, leading from the pawl, hooked over the pivoted hook frame 39. To retain the parts in this position, the hook frame is locked in hooking position by the lock 40, which is hinged to the end of the hand lever. When this lock 40 is swung to one side, the hook frame 39 releases the rod 38 and permits the pawl to engage the teeth 37. As shown in Fig. 2, the hand lever 34$^a$ and connected parts are bow-shaped, so as to provide corresponding parts at each side of the machine, but it will not be necessary to go more into detail as to these parts, since a reference to Figs. 1 and 2 will make their construction easily understood.

The ends of the frame 9 are provided with a cross shaft 41 upon which a grooved roller 42 is journaled, said roller adapted to roll upon the upper surface of the pipe 3, as shown. It will be understood that this roller facilitates the shifting of the machine along the line of pipe. When the side frames or bars 8 are detached from the head 7 and the calking tool 12 and section or bar 22 of the calking head 11 removed, the bars 8 and head 11 thereon may be lifted and the machine moved along the pipe upon roller 42 like a wheel barrow. In making the disconnection of the side frames 8 from the head 7, it is only necessary to pull out the pins 20 and swing the links 8$^b$ outward toward the hinged pins 8$^c$ on side frames 8.

When the pipe sections are engaged in the trench they will present a good support for the calking machine, but in some instances it is desirable to reduce the downward thrust of the power devices upon the pipe, and to stabilize the machine on said pipe. This may be done by employing the shoes 44 jointedly connected to the lower ends of the links 43, which are hinged at their upper ends to the transverse shaft 41. When the shoes 44 rest upon the ground or upon other support, the operation of the power devices will not impart any severe thrust downward upon the pipe. When the use of these shoes are not required, they may be turned upward sufficiently to be out of the way. They may be omitted, if desired.

In the operation of my improved tool for calking the pipe joint shown in Fig. 9, I proceed as follows: I first insert an annular lead strip 30 whose normal cross section corresponds to that of strip 33 inverted, and by the use of the machine the calking tool 12 drives this lead strip tightly into the space between the spigot end 5 and bottom of the bell socket, said lead curving inward at its forward or beveled end and flattening at its outer end. When this is being done, the pawl 36 is engaging the uppermost tooth and socket 37. The calking tool is then withdrawn from the bell and the textile packing 31 introduced. The calking tool is then employed to drive in this packing; and may be manipulated, if desired, during the act of introducing the packing to pack successive strands as introduced. During the final portion of this operation the pawl 36 may be placed in engagement with the middle tooth and socket 37. After the packing 31 is driven in, the outer end of the bell is filled by two concentrically arranged lead strips 32 and 33, which are driven in by a calking tool 12 of shorter length. In this operation the pawl 36 is placed in engagement with the lowermost tooth and socket 37. When the lead calking strips 32 and 33 are driven into the bell to seal it, their beveled edges cause the lead to spread, the strip 33 pressing tightly upon the surface of pipe section 3 and strip 32 bending outward and extending into the usual undercut groove as shown in Fig. 9. While my calking machine is particularly useful in calking pipe joints with my improved packing (Fig. 9), I in no wise restrict myself in its use, as it may be employed with excellent advantage for other forms of packing.

While I do not restrict myself to the particular means for imparting the longitudinal reciprocation of the calking tool which is hereinbefore described, nevertheless there are certain advantages in this construction which facilitate the manipulation, and these advantages may be more specifically stated as follows:

The pawl 36 is notched and slotted at its outer edge as indicated at 36ª, and when pulled up to the position indicated in Fig. 1, this slotted portion receives the projecting part 36ᵇ from the frame 34. When the pawl is hooked up in this manner by the link 38 being hooked over the hook 39, the lever 34ª and the frame 34 may be moved as a unit and impart quite an extended movement to the calking head 11 and its tool 12, which operation may be employed when forcing in the textile packing, and when withdrawing the calking tool from the bell for inserting packing or introducing the lead strips.

When, however, it is desired to exert great power for forcing the lead strips into position, the link 38 is unhooked and the pawl moved down into engaging position with the teeth 37 as indicated in dotted lines in Fig. 1. When in this adjustment, the lever 34ª co-operates with the frame 34 as a toggle and exerts great power with relatively small movement to the calking tool. This will enable the necessary power to be exerted for insuring the shaping of the metal strips when being forced into position.

It will be seen that the essential features entering into my improved machine, are that the power applying means must be anchored, as it were, on one pipe section and the calking tool be driven into the bell of that section; in other words the power devices are connected to the bell end of one pipe section and operate the calking tool arranged to move over the body of the next section, and into the bell socket, whereby all of the calking strains are sustained by the bell which is being calked. By reason of this, the possible strain which may be applied in the calking operation is only limited by the strength of the bell pipe. My invention embodies this feature broadly irrespective of the details which have been incorporated into the machine by way of example.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention as set forth in the appended claims.

Having now described my invention, what I claim as new and desire to secure by Letters Patent, is:

1. A calking machine for making a bell and spigot pipe joint, comprising a detachable head adapted to engage the body of the pipe adjacent to the bell end thereof and provided with clamping means for clamping the head upon the pipe, calking means carrying a calking tool and adapted to move longitudinally relatively to the spigot end of the pipe engaging said bell, and manually operable devices having their weight supported upon the spigot pipe end and connected with the detachable head and with the calking means whereby the calking means is made to move toward the detachable head in the act of forcing the calking tool against the calking materials in the socket of the bell and also permitting said calking tool to be positively moved away from the detachable head in the act of removing the calking tool from contact with the calking material in the socket of the bell.

2. The invention according to claim 1, further distinguished by having the detachable head formed in two parts adapted to be arranged on oposite sides of the pipe back of the bell thereof, said head provided with means at the bottom to link the two parts together under the pipe and further provided at its upper end with screw clamping devices for drawing the two parts toward each other for positively clamping them upon the pipe to prevent the head shifting longitudinally as well as against circumferential movement.

3. The invention specified in claim 1, wherein the detachable head is made of a plurality of clamping parts arranged to be adjusted about the bell end of the pipe, and provided with screw clamping means for holding the parts in desired relative clamping positions to prevent the head passing over or shifting relatively to the bell of the pipe.

4. The invention according to claim 1, wherein further the connecting means between the detachable head and the manually operable devices consists of two side frames respectively connected at one end with the detachable head on opposite sides and having their other ends united by a frame having an upper transverse portion adapted to rest upon the pipe and in that manner held against downward thrust and providing a support for the manually operable devices.

5. The invention specified in claim 1, wherein the connecting means between the detachable head and the manually operable devices comprise two side frames, having one of their ends detachably connected with the detachable head and their other ends connected by a frame so constructed as to extend over the body of the pipe and be supported thereby, and said manually operable devices hingedly positioned on said frames so as to simultaneously provide force upon the side frames and the detachable head in one direction and upon the calking means in the opposite direction.

6. The invention specified in claim 1, further characterized by having the manually operable devices hingedly connected in relation to and with the detachable head and so connected with the calking means that it may be thrust forward toward the detachable head or withdrawn backwardly relatively thereto in a positive manner, said manually operable devices having means which at all times in operation have their weight sustained on the spigot pipe end.

7. The invention specified in claim 1, wherein the calking means is made up of parts comprising a sliding head and a detachable sectional calking tool carried thereby and constructed so as to be removably applied about the body of the pipe.

8. The invention specified in claim 1, wherein the calking means comprise a calking tool made in detachable parts so as to be removable from about the body of the pipe, said calking means provided with supporting and operating means for the calking tool having recesses, and said calking tool parts provided with outward projections received in said recesses in the supporting and operating means, whereby the tool parts are removable from the supporting and operating means.

9. A calking machine for calking joints between pipe sections, comprising a detachable means adapted to fit back of the enlarged bell portion of one of the pipe sections, two side frames respectively secured at one end to the sides of the detachable means so as to be positioned at opposite sides of the pipe, said side frames having their other ends united by a frame having a transverse portion adapted to fit over the body of the pipe whereby said side frames are further supported, a calking tool arranged to slide longitudinally on the side frames and guided thereby, and manually operable devices hingedly connected in relation to the side frames, and having a connection with the calking tool for forcing it toward the detachable means when calking the pipe joint.

10. The invention specified in claim 1, wherein the calking tool is made in cylindrical form to surround the pipe body and split longitudinally so as to be capable of being separated for removal from the pipe and body and detachably secured to a calking head providing connection with the manually operable applying devices.

11. The invention specified in claim 9, wherein the calking tool is made in parts so that it may be fitted about or removed from the pipe body, and connecting means between the manually operable devices and the calking tool comprising parts which are guided upon the side frames and shaped to detachably receive and hold the calking tool parts.

12. The invention specified in claim 9, wherein the calking tool is further provided with downwardly extending portions adjacent to the manually operable devices for reaching to the ground below the pipe thereby sustaining the downward thrust on the side frames and weight of the manually operable devices as well as stabilizing the machine in position on the pipe.

13. The invention specified in claim 9, wherein the manually operable devices comprise a lever and rods for reciprocating the calking means, and manual means embodying a toggle construction for varying the force of their action upon the calking means and calking tool, whereby they may be moved at greater or less speed and with greater power toward the detachable head.

14. The invention specified in claim 9, wherein the head which is adapted to the bell of the pipe is formed in parts and detachably secured to the side frames.

15. The invention specified in claim 9, wherein the head is formed of two curved parts adapted to fit upon diametrically opposite sides of the pipe, said parts connected by means whereby they may be positioned and clamped tightly upon the pipe, and to which parts the side frames are detachably connected.

16. The invention specified in claim 9, wherein the calking tool is formed of curved detachable parts, and there is further provided a calking head guided upon the side frames and operated by the manually operable devices, said head carrying the calking tool sections, said calking head made of an inverted U shape to fit over the pipe body and provided on its open end with a locking section bridging the opening of the U shaped calking head, and said locking section also supporting the calking tool parts.

17. The invention specified in claim 1, wherein the manually operable devices are provided with adjustable means whereby they become inoperative or operative, as desired, while maintaining the normal connection with the detachable head and calking means.

18. In a calking machine, means detachably connectible with the enlarged or bell end of a pipe, combined with side frames extending from said detachable means, a calking tool supported and guided by the side frames and made in sections so as to be removable from the pipe, manually operable devices hinged to the side frames and having a connection with the calking tool to move it toward the said detachable means connected to the bell end of the pipe, and adjustable means embodied in the manually operable devices for varying the force of its action upon the calking tool.

19. Combination of two pipes forming a bell and spigot joint, with a calking machine comprising detachable means adapted to engage the bell end of one of the pipes so as to be held against longitudinal movement in the direction of the other pipe, two side frames respectively extending from the detachable means at the opposite sides of the pipe and positioned longitudinally thereon, a calking tool supported by the side frames and removably arranged with respect to either one of the pipes and movable into and out of the calking space of the bell, and manually operable devices connected with the said side frames adapted to move the calking tool into the calking space of the bell and toward the detachable means attached thereto, said manually operable devices tending to simultaneously move the detachable means and the calking tool relatively toward each other in calking and from each other in removing the calking tool.

20. The combination of two pipes providing a bell and spigot joint, with a machine for calking the joint comprising a detachable calking tool movable into and out of the socket of the bell, manually operable devices for operating the calking tool, and means detachably clamped in immovable gripping position upon the pipe back of the bell for maintaining the manually operable devices in position during their entire reversal operation upon the calking tool.

21. The combination of two sections of pipe providing a bell and spigot joint, with a machine for calking the joint comprising a detachable calking tool movable into and out of the socket of the bell, manually operable devices for operating the calking tool, means for sustaining the weight of the manually operable devices upon the body of section of the pipe having the spigot portion and at a distance from the bell and socket of the pipe joint, and separate means detachably but rigidly clamped upon the other pipe section back of the bell thereof for holding the manually operable devices in position thereon during their operation upon the calking tool in both directions.

In testimony of which invention, I hereunto set my hand.

WILLIAM H. FLINT.